March 5, 1968 R. O. ENGH ET AL 3,372,279
ULTRAVIOLET SENSITIVE GEIGER-MUELLER TYPE RADIATION DETECTOR
Filed May 6, 1965 2 Sheets-Sheet 2
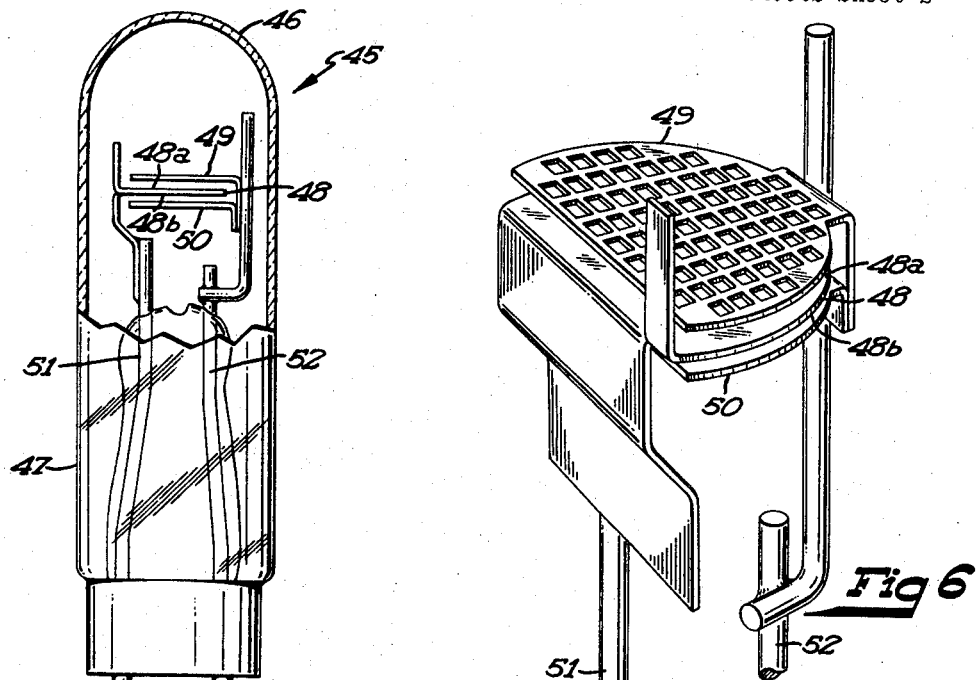
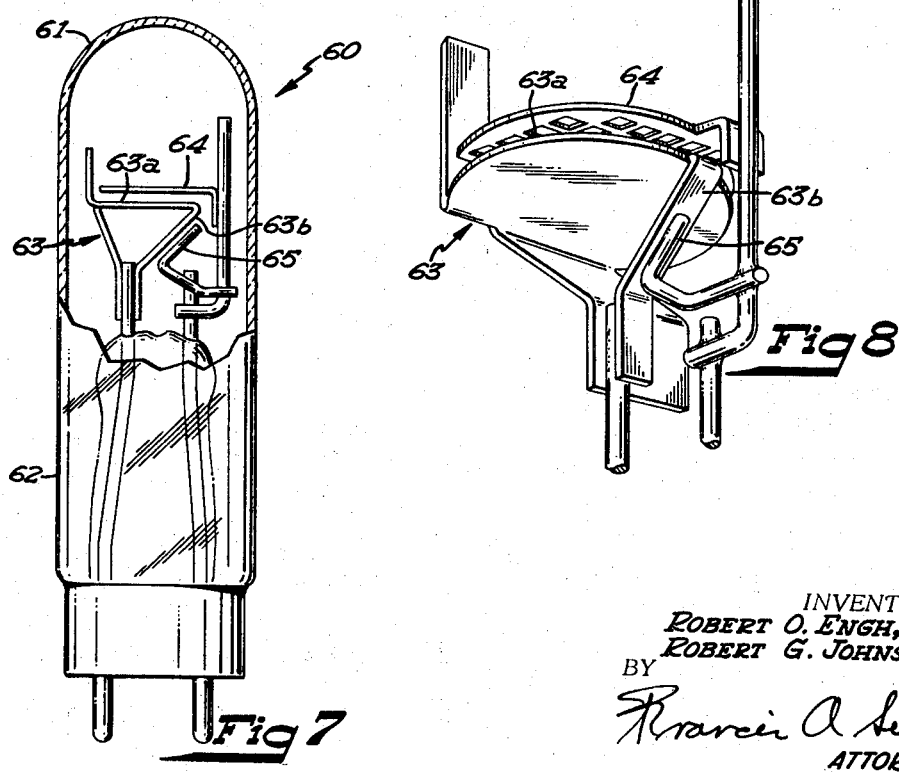
INVENTORS
ROBERT O. ENGH,
ROBERT G. JOHNSON
BY
ATTORNEY United States Patent Office 3,372,279
Patented Mar. 5, 1968

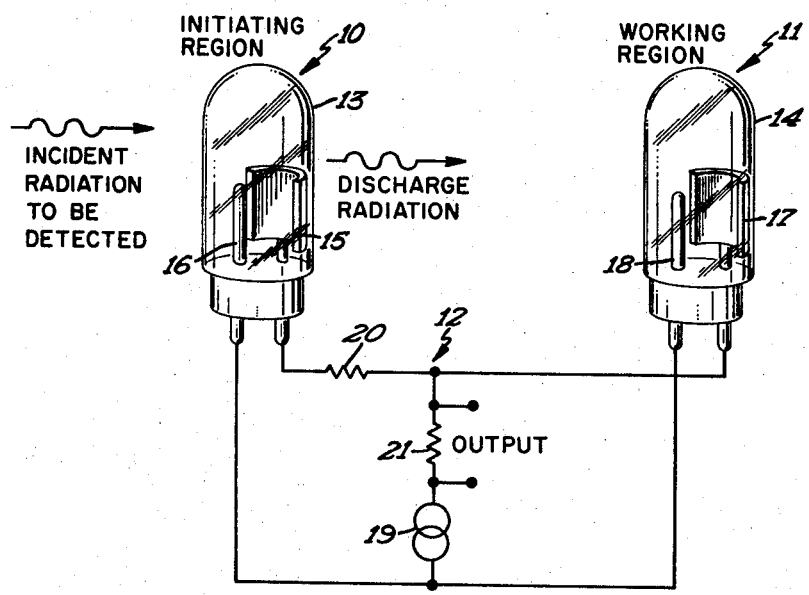

3,372,279
ULTRAVIOLET SENSITIVE GEIGER-MUELLER TYPE RADIATION DETECTOR
Robert O. Engh and Robert G. Johnson, Hopkins, Minn., assignors to Honeywell Inc., Minneapolis, Minn., a corporation of Delaware
Filed May 6, 1965, Ser. No. 453,792
12 Claims. (Cl. 250—83.6)

ABSTRACT OF THE DISCLOSURE

An ultraviolet detector having an anode-cathode arrangement providing an initiating region wherein discharge occurs in response to detected radiation and an anode-cathode arrangement providing a working region to which the discharge is subsequently transferred.

---

This invention is related to radiation sensitive, gaseous discharge detectors of the Geiger-Mueller type. More particularly, it is concerned with improved electrode configurations and circuit arrangements for use with ultraviolet detectors of this type.

Geiger-Muller detectors are broadly old in the art. They have been used for the detection of corpuscular and electromagnetic radiation. They have also been widely used as ultraviolet detectors. Therefore, this invention will be described with particular reference to ultraviolet detectors although it can be used to improve the detection of other types of radiation and other wavelengths as well.

The Geiger-Mueller detector generally consists of a radiation permeable envelope containing a pair of spaced electrodes and an ionizable gas fill. In operation, an electrical potential is impressed across the electrodes. However, this potential is not high enough to cause spontaneous discharge or ionization of the gas fill between the electrodes. Upon entrance of ultraviolet radiation into the envelope, which radiation strikes the cathode to liberate electrons, the gas fill becomes ionized by action of the liberated electrons and discharge occurs between the electrodes. The discharge is an indication of the presence of the ultraviolet radiation.

In prior art detectors of this type, the responsive portion of the cathode, adapted to be responsive to the radiation to be detected, has been the same portion at which continued discharge has been allowed to occur. Continued discharge at or near the responsive portion of the cathode has been found to detrimentally affect the operation of the detector due to sputtering of the electrodes. Sputtering is the removal of the electrode material from the electrode by the discharge. The sputtered material tends to deposit on the interior surfaces of the envelope in the vicinity of the responsive portion of the cathode thus blocking the entrance of the radiation to be detected and preventing the desired cathode sensitivity or response.

High work function electrode materials tend to operate with minimal amounts of sputtering and are satisfactory to a certain extent. Unfortunately, this requirement that the cathode material be of a high work function in order to avoid sputtering has by its very nature limited the wavelength of the radiation that can be detected. That is, electrode materials having a relatively high work function are sensitive only to shorter wavelength radiation.

The present invention is directed to the solution of these problems and provides novel electrode configurations and circuit arrangements for use in radiation detectors of the Geiger-Mueller type. Broadly, the solution is achieved by providing two regions within the detector.

A first region or initiating region is provided which is adapted to be responsive to the radiation to be detected and to initiate the discharge. Once discharge is initiated in the initiating region it is quickly transferred to a second region or working region where discharge is allowed to continue until quenched. Subsequently, discharge is substantially limited or completely extinguished in the initiating region.

The initiating region may consist of a separate anode and cathode or may utilize a portion of either an anode or cathode which is common with the working region. The working region may also consist of a separate anode and cathode or may likewise use a portion of an anode or cathode which is common with the initiating region.

In using initiating and working regions in accordance with this invention, the initiating region is positioned in the detector where it will receive the radiation to be detected. Since discharge is quickly transferred to the working region, sputtering is inhibited in the initiating region. Thus, sputtered electrode materials are not deposited on the interior surface of the envelope in the vicinity of the initiating region and do not prevent the entrance of the radiation to be detected.

As previously discussed, one way of avoiding sputtering is to use electrodes of high work function. The high work function materials limit detection to radiation of shorter wavelengths such as wavelengths less than 2500 A. for nickel cathodes.

When it is desired to extend operation of detectors to the longer wavelengths, the present invention may also be used to advantage. A low work function material may be used in the initiating region and a high work function material may be used in the working region. Since discharge is quickly transferred from the initiating region to the working region, the sputtering of the low work function material, which tends to sputter more readily, is inhibited and the low work function materials may be used over a long time period to detect the longer wavelength radiation. For example, a copper cathode may be used in the initiating region to extend detector response above 2750 A. Of course, these wavelengths are also affected by other parameters such as, gas fill composition and pressure.

Therefore, this invention is broadly directed to an arrangement for initiating discharge in an initiating region and quickly transferring it to a working region where sputtering may occur without a detrimental effect on the operation of the detector. An electrode geometry which accomplishes the above is referred to as discharge transfer geometry.

With this in view, a detector in accordance with this invention broadly embodies an initiating region to detect radiation and to initiate discharge, the initiating region having a first cathode and anode means disposed in an ionizable gaseous medium, and a working region to which the discharge is transferred and where it continues until quenched, the working region having a second cathode and anode means disposed in an ionizable gaseous medium.

FIGURE 1 is a schematic diagram of a detector system and circuit arrangement prepared in accordance with this invention;

FIGURE 2 is a diagrammatic view of another embodiment of a detector in accordance with this invention;

FIGURE 3 is a diagrammatic view of yet another embodiment of a detector in accordance with this invention;

FIGURE 4 is a top view of the detector of FIGURE 3 showing the electrode arrangement;

FIGURE 5 is a side view, partially broken away, of still another embodiment prepared in accordance with this invention;

FIGURE 6 is a somewhat enlarged perspective view of a portion of the detector of FIGURE 5, showing the discharge transfer geometry of the electrodes for a preferred embodiment;

FIGURE 7 is a side view, partially broken away, of another embodiment of a detector prepared in accordance with this invention, showing a different electrode configuration which the discharge transfer geometry may take.

FIGURE 8 is a somewhat enlarged perspective view of a portion of the detector of FIGURE 7.

Referring now to FIGURE 1, an embodiment of this invention is shown which takes the form of two separate detectors, generally designated as 10 and 11, to form a single detector system which is connected into a common circuit, generally designated as 12. Radiation enters the detectors through envelopes 13 and 14 formed of ultraviolet transparent glass such as Corning type No. 9471. Detector 10 provides an initiating region consisting of cathode 15 and anode 16. Molybdenum, nickel and tungsten are satisfactory electrode materials. Detector 11 provides a working region consisting of cathode 17 and anode 18. The same materials used in detector 10 may be used for the electrodes in detector 11. While the electrodes in detectors 10 and 11 are shown in a cylinder-wire combination, other combinations such as all-wire electrodes and parallel plate electrodes are also satisfactory. Furthermore, different electrode arrangements may be used in each detector if desirable for particular applications.

Circuit 12 shows an AC voltage source 19 connected to detectors 10 and 11. AC is used in this particular embodiment to provide a quenching action. DC voltage can also be utilized, along with means to quench the detectors.

Two resistors 20 and 21 are included in circuit 12. Resistor 20 is quite large compared to resistor 21 and functions to limit the current flowing to cathode 15. Thus, it is possible to use cathode materials of low work function which would otherwise be destroyed or damaged by a large load current. Even if a high work function material such as molybdenum, nickel and tungsten, is used for cathode 15, sputtering is kept to a minimum because the load current discharge occurs chiefly in detector 11 and only a small current discharge occurs in detector 10. Resistor 21 is used as a load means across which an output can be obtained by any suitable means such as an electronic counter or other suitable meter (not shown).

Upon receiving incident radiation of the proper wavelength, ionization occurs within detector 10 causing conduction to occur due to the gas discharge which takes place in the initiating region between cathode 15 and anode 16. This gas discharge generates a discharge radiation which enters detector 11, where a second gas discharge occurs in the working region between cathode 17 and anode 18.

Upon ionization and gas discharge in detectors 10 and 11, current flows therethrough since the detectors become conductive. The bulk of the current flow occurs between cathode 17 and anode 18 since current flow between cathode 15 and anode 16 is limited by large resistor 20. Thus, incident radiation can initiate gas discharge in detector 10 while detector 11 carries the bulk of the current.

It can be seen that the arrangement of FIGURE 1 limits the sputtering which occurs in detector 10, thus maintaining the overall sensitivity of the arrangement. Furthermore with this arrangement, detector 10 may use cathode materials which would otherwise be damaged or destroyed by sputtering since current to detector 10 is limited by resistor 20. Cathode 15, for example, might be an easily sputtered copper cathode while cathode 17 might be a tungsten cathode which is very refractory and relatively resistant to sputtering.

In addition, when the initiating region and the working region are contained in separate envelopes, as in this arrangement, more latitude in operating parameters is available since each set of electrodes can be contained in different gas mixtures and/or at different gas pressures if desired.

Referring now to FIGURE 2, a second embodiment is shown wherein the initiating region and the working region are contained in a common envelope 25. In this embodiment as in that of FIGURE 1, the initiating region consists of a cathode 26 and an anode 27; the working region consists of a cathode 28 and an anode 29.

The electrode geometry is slightly different from that of FIGURE 1 in that this embodiment is an end viewing type of detector utilizing parallel plate electrodes. Incident radiation to be detected enters through the upper portion 30 of envelope 25, passes through anode 27, which is a screen or mesh anode, and strikes cathode 26 to initiate gas discharge.

The circuit connected to the detector, generally designated 31, is the same as that used in FIGURE 1 and operates in essentially the same manner since it is connected to the four electrodes in the same way as in FIGURE 1.

However, the mode of operation of this embodiment is slightly different from that of FIGURE 1 in that the arrangement of FIGURE 1 relied on photon coupling between detectors 10 and 11 to initiate gas discharge in the working region. That is, the discharge radiation originating in the initiating region was utilized to activate the second detector which contained the working region. In the device of FIGURE 2, discharge radiation may in part activate the working region between cathode 28 and anode 29. However, it is believed that the photons, electrons and consequent ionization of the gas fill initiated in the initiating region between cathode 26 and anode 27 are primarily responsible for initiating discharge in the working region.

This effect allows for another means which may be used to limit the initiating region discharge and transfer it from the initiating region to the working region. In FIGURE 1, this was accomplished by limiting the current flowing to the initiating region by means of circuit 12, particularly resistor 20. In FIGURE 2, the current limiting approach is used again. However, the spacing of the electrodes in each region is adjusted to further promote discharge in the working region and inhibit it substantially or completely in the initiating region.

The essence of this aspect of the invention lies in the relative spacing of the electrodes in each region which is provided to form gas discharge regions between cathode 26 and anode 27 and between cathode 28 and anode 29. It has been found that the gas discharge initiated in the initiating region can be automatically transferred to the working region by proper adjustment of the discharge region widths $d$ between cathode 26 and anode 27 and between cathode 28 and anode 29.

E, the field strength in a discharge region, is equal to the voltage V divided by the distance $d$ across which the voltage is impressed.

$$E = V/d$$

At any given voltage, large distances reduce the field strength while small distances increase it. The discharge has a natural tendency to occur in the region having the highest field strength when $d$ is greater than the spacing corresponding to the minimum breakdown voltage of the gas fill. For any given V, if $d$ is small, the field strength E will be large. If $d$ is large, then the field strength E will be relatively small. This is in accordance with the well known Paschen breakdown curve as described in "Reviews of Modern Physics" vol. 12, No. 2, 1940, "The Mechanism of Electrical Discharges in Gases of Low Pressure," F. M. Penning and M. J. Druyvesteyn.

Thus, by providing a relatively large distance between cathode 26 and anode 27 and a relatively small distance between cathode 28 and anode 29, discharge after initiation in the initiating region is automatically transferred, at any given voltage, to the working region where it is allowed to continue until quenched.

Reference is now made to FIGURES 3 and 4 which show another embodiment that this invention may assume. The detector, generally designated 35, illustrates the use of a three electrode combination to form the initiating and working regions. Positioned within detector 35 is cathode 36, anode 37 and cathode 38. The initiating region is formed between electrodes 36 and 37 while the working region is formed between electrodes 37 and 38. The relative spacing of cathodes 36 and 38 with respect to anode 37 may be adjusted (as shown) in accordance with the teachings hereinabove to accomplish discharge transfer from the initiating region to the working region. It will be noted that the electrodes shown are of the wire type. Other types as described herein are also suitable. For example, parallel plate electrodes may be used.

Detector 35 is shown connected into circuit 39. This circuit is again the same as that shown in FIGURES 1 and 2. This particular circuit is not necessary to the operation of the detector since others may also be used. This circuit is shown to allustrate the alternate means for accomplishing transfer of the discharge from the initiating region to the working region. The circuit may be utilized in conjunction with the adjusted spacing of the electrodes (as shown) or either means may be utilized singly. If the circuit is used alone, the electrodes may be spaced equidistant from each other and still operate satisfactorily in accordance with this invention.

In the embodiment as shown, cathode 38 is closer to anode 37 than is cathode 36. This is shown more clearly in FIGURE 4 which is a top view of the detector of FIGURE 3. From this figure it can be seen that electrodes 36 and 37 allow a field of view for receiving incident radiation to be detected as illustated and form the initiating region. Cathode 38 is spaced closer to anode 37 than is cathode 36 and is behind 36 and 37. Thus, sputtering which occurs in the working region formed between anode 37 and cathode 38 is blocked by anode 37 and cathode 36. The sputtered materials then tend to collect toward the rear portion of the detector envelope rather than toward the front portion of the envelope which serves as the entrance area for incident radiation to be detected.

FIGURES 5 and 6 illustrate a preferred embodiment of a radiation detector 45 prepared in accordance with this invention. This particular configuration is known as the end view type in which detector 45 is designed to receive radiation through the end portion 46 of envelope 47. Positioned within envelope 47 is cathode 48 and anodes 49 and 50. Cathode 48 and anodes 49 and 50 are held in a predetermined spatial relationship by support wires 51 and 52 respectively which may be of Kovar or other suitable material, or which may be integral parts of the cathode and anode respectively. Anode 49 is a screen or mesh electrode in this embodiment since it is of the end viewing type and it is necessary that radiation entering through end portion 46 of the envelope be allowed to pass through anode 49 and impinge upon the upper surface 48a of the cathode. In detectors other than the end viewing type, anode 49 may of course be of a solid construction. Cathode 48 may be formed of molybdenum, nickel or tungsten in the case of ultraviolet detectors which are designed to be sensitive to the shorter wavelength radiation. However, due to the discharge transfer geometry provided by this invention, materials of a lower work function, such as copper and aluminum, may be utilized for cathode 48 in order to make the detector sensitive to longer wavelengths, if desired. Other materials may be used as will be obvious to those skilled in the art. Anode 50 may also be of the more typical electrode materials such as molybdenum, nickel or tungsten.

The preferred cathode-anode geometry for this embodiment is the parallel planar configuration as shown by the arrangement of electrodes 48, 49 and 50 in FIGURE 5. Their relationship is more clearly shown in FIGURE 6. This form provides maximum sensitivity due to the uniform homogeneous electrical field created. However, other electrode configurations will function in an improved manner if used in accordance with the teachings found herein.

In operation, the discharge transfer geometry as taught by the present invention functions as follows: Radiation entering through portion 46 of envelope 47 passes through anode 49 to strike the radiation sensitive surface 48a of cathode 48. The impingement of radiation upon this surface liberates electrons which initiate discharge between surface 48a and anode 49 in the discharge region which exists therebetween. This description of the operation assumes that the electrodes are connected to a source of electrical potential as described hereinabove. Due to the closer spacing of anode 50 with respect to the under surface 48b of cathode 48 and the stronger field strength existing in the region between 48b and anode 50, discharge once initiated automatically transfers to this region where it continues until quenched. Thus, there is provided an electrode configuration wherein the radiation responsive surface of the cathode which initiates discharge is exposed to discharge only for very short periods of time. Thus, the sensitivity of the detector due to sputtered materials is not detrimentally affected. Sputtering is effectively limited due to the short time that the discharge exists in proximity to the radiation responsive surface 48a. Sustained discharge occurs only between surface 48b of cathode 48 and anode 50 where cathode response is not important once the radiation has been initially detected.

FIGURES 7 and 8 illustrate another embodiment of a radiation detector 60 having an alternate electrode configuration of the discharge transfer geometry type similar to that of FIGURES 5 and 6. This particular configuration is also of the end view type as is the detector in FIGURES 5 and 6. The detector is designed to receive radiation through the end portion 61 of envelope 62 which is made of an ultraviolet transparent glass. Positioned within envelope 62 is a cathode 63 having an upper radiation sensitive surface 63a which is adapted to receive impinging radiation entering through end portion 61 of envelope 62. Cathode 63 also has a downwardly extending side member 63b which is adapted to function as the discharge portion of the cathode. Also positioned within envelope 62 are anodes 64 and 65. Anode 64 is a screen or mesh electrode to allow radiation entering the detector through end portion 61 to strike the radiation sensitive portion 63a of cathode 63. The spacing between anode 64 and cathode portion 63a may generally be the same as that shown in FIGURES 5 and 6. Anode 65 is shown in a more closely spaced relationship with cathode portion 63b than is anode 64 to cathode portion 63a. This again is in order to adjust the relative field strengths of the discharge regions existing in the detector between anode 64 and cathode portion 63a (initiating region) and between anode 65 and cathode portion 63b (working region). The operation of the tube is the same as that of the preferred embodiment described in connection with FIGURES 5 and 6.

It is to be understood that detectors prepared in accordance with this invention may be other than the end view type. The detectors may assume any of a number of forms well known in the art and still utilize the teachings of this invention. The end view configuration is primarily discussed herein since it is the preferred configuration for many commercial applications. However, the invention should not be limited to the embodiments described herein. Persons skilled in the art will readily utilize these teachings for the construction of a large variety of radiation detectors.

What is claimed is:

1. A radiation detector constructed and arranged to be sensitive to radiation of a given characteristic, comprising:
   a radiation permeable envelope;
   an ionizable medium in said envelope;
   a planar cathode in said envelope, said cathode having an upper surface responsive to radiation of the given characteristic for initiating gaseous discharge and a lower surface which is substantially parallel to said upper surface;
   first means supporting said cathode with said upper surface oriented so as to receive radiation to be detected;
   a first planar anode in said envelope, said first anode being adapted to allow the transmission of radiation therethrough;
   second means supporting said first anode above the upper surface of said cathode, substantially parallel thereto and at a first predetermined distance therefrom to form an initiating region for gaseous discharge;
   a second planar anode in said envelope, and
   third means supporting said second anode below the lower surface of said cathode, substantially parallel thereto and at a second predetermined distance therefrom to form a working region for gaseous discharge, said second distance being less than said first distance.

2. A radiation detector constructed and arranged to be sensitive to radiation of a given characteristic, comprising:
   a radiation permeable envelope;
   an ionizable medium in said envelope;
   a cathode in said envelope including a substantially horizontal portion responsive to radiation of the given characteristic for initiating gaseous discharge, said horizontal portion having at least one downwardly extending side member;
   first means supporting said cathode;
   a planar anode in said envelope, said planar anode being adapted to allow the transmission of radiation therethrough;
   second means supporting said planar anode above the radiation responsive portion of said cathode, substantially parallel thereto and at a first predetermined distance therefrom to form an initiating reigon for gaseous discharge;
   a wire anode in said envelope having a portion thereof substantially parallel to the downwardly extending side member of said cathode, and
   third means supporting said wire anode and spacing it from said side member at a second predetermined distance therefrom to form a working region for gaseous discharge, said second distance being less than said first distance.

3. A radiation detector constructed and arranged to be sensitive to radiation of a given characteristic, comprising:
   a radiation permeable envelope;
   an ionizable medium in said envelope;
   a cathode in said envelope, said cathode having a radiation responsive portion and a working portion;
   first means supporting said cathode;
   a first anode member;
   second means supporting said first anode member at a first predetermined distance from the radiation responsive portion of said cathode to form an initiating region for gaseous discharge;
   a second anode member, and
   third means supporting said second anode member at a second predetermined distance from the working portion of said cathode to form a working region for gas discharge, said second distance being less than said first distance.

4. A radiation detector constructed and arranged to be sensitive to radiation of a given characteristic, comprising:
   a radiation permeable envelope;
   an ionizable gaseous medium in said envelope;
   an anode in said envelope;
   a first cathode in said envelope positioned at a predetermined first distance from said anode to form an initiating region therebetween for gaseous discharge, said first cathode being responsive to the radiation of a given characteristic to initiate the discharge, and
   a second cathode in said envelope positioned at a predetermined second distance from said anode to form a working region therebetween for gaseous discharge, the discharge occurring in said working region in response to the discharge in said initiating region, said second distance being less than said first distance to promote the transfer of discharge, after initiation in said initiating region, to said working region and to quench the discharge in said initiatng region.

5. The detector of claim 4 wherein said first cathode is of a material having a lower work function than the material of said second cathode.

6. A radiation detector constructed and arranged to be sensitive to radiation of a given characteristic, comprising:
   a radiation permeable envelope;
   an ionizable medium in said envelope;
   a first cathode and anode pair in said envelope;
   first means supporting said first cathode and anode pair in a first predetermined spaced relationship to form an initiating region for gaseous discharge;
   a second cathode and anode pair in said envelope;
   second means supporting said second cathode and anode pair in a second predetermined spaced relationship to form a working region for gaseous discharge, said second spaced relationship being smaller than said first spaced relationship in order to promote the transfer of a discharge from said initiating region to said working region.

7. A radiation detector constructed and arranged to be sensitive to radiation of a given characteristic, comprising:
   a first cathode and anode pair disposed in spaced relationship in an ionizable gaseous medium to form an initiating region for gaseous discharge therebetween, said first cathode being responsive to the radiation of a given characteristic, and
   a second cathode and anode pair disposed in spaced relationship in the ionizable medium to form a working region for gaseous discharge, the spacing between said second pair being less than the spacing between said first pair in order to promote the transfer of a discharge from said initiating region to said working region.

8. The detector of claim 7 in which the cathode of said first pair is of a material having a lower work function than the material of the cathode of said second pair.

9. A radiation detector system constructed and arranged to be sensitive to radiation of a given characteristic, comprising:
   a first detector including a first cathode and anode pair disposed in spaced relationship in an ionizable medium to form an initiating region for gaseous discharge therebetween, said first detector being responsive to the radiation of a given characteristic,
   a second detector including a second cathode and anode pair disposed in spaced relationship in an ionizable medium to form a working region for gaseous discharge, said second detector being responsive to the radiation generated by a discharge in said first detector, and circuit means electrically connected to said first and second cathode and anode pairs, said circuit means including a first relatively small resistor connected between said first and second cathode and anode pairs and a second relatively large resistor connected between said first cathode and anode pair.

10. A radiation detector constructed and arranged to be sensitive to radiation of a given characteristic, comprising:

first cathode and anode means disposed in spaced relationship in an ionizable gaseous medium to form an initiating region for gaseous discharge therebetween, said cathode means being responsive to the radiation of a given characteristic to initiate the gaseous discharge;

second cathode and anode means disposed in spaced relationship in an ionizable medium to form a working region for gaseous discharge, the discharge occurring in said working region in response to a discharge in said initiating region, and circuit means electrically connected to said first and second cathode and anode means, said circuit means including a first relatively small resistor connected between said first and second cathode and anode means and a second relatively large resistor connected between said first cathode and anode means.

11. A radiation detector constructed and arranged to be sensitive to radiation of a given characteristic, comprising:

first cathode and anode means disposed in spaced relationship in an ionizable gaseous medium to form an initiating region for gaseous discharge therebetween, said cathode means being responsive to the radiation of a given characteristic;

second cathode and anode means disposed in spaced relationship in an ionizable medium to form a working region for gaseous discharge, a discharge occurring in said working region in response to a discharge in said initiating region, and means controlled by a discharge in said working region to substantially decrease discharge in said initiating region.

12. A radiation detector constructed and arranged to be sensitive to radiation of a given characteristic, comprising:

first cathode and anode means disposed in spaced relationship in an ionizable gaseous medium to form an initiating region for gaseous discharge therebetween, said cathode means being responsive to the radiation of a given characteristic to initiate the gaseous discharge;

second cathode and anode means disposed in spaced relationship in an ionizable medium to form a working region for gaseous discharge, the discharge occurring in said working region in response to a discharge in said initiating region, and electrical circuit means connected between said first and second cathode and anode means, said circuit means being activated by a discharge in said initiating region to substantially decrease the discharge therein after discharge occurs in said working region.

References Cited
UNITED STATES PATENTS

| | | | |
|---|---|---|---|
| 2,485,516 | 10/1949 | Thompson | 250—83.6 |
| 2,643,343 | 6/1953 | Rainwater | 250—83.6 |
| 3,230,372 | 1/1966 | Spracklen | 250—83.6 |
| 3,255,354 | 6/1966 | Cade | 250—83.6 |

ARCHIE R. BORCHELT, *Primary Examiner.*